(12) United States Patent
Krywitsky

(10) Patent No.: US 7,988,200 B2
(45) Date of Patent: Aug. 2, 2011

(54) FLUID SYSTEM COUPLING WITH PIVOTING HANDLE ACTUATING MEMBER

(75) Inventor: Lee A. Krywitsky, Calgary (CA)

(73) Assignee: Hiltap Fittings, Ltd., Calgary, Alberta (CA)

( * ) Notice: Subject to any disclaimer, the term of this patent is extended or adjusted under 35 U.S.C. 154(b) by 352 days.

(21) Appl. No.: 12/176,718

(22) Filed: Jul. 21, 2008

(65) Prior Publication Data
US 2010/0013216 A1   Jan. 21, 2010

(51) Int. Cl.
F16L 37/248 (2006.01)
F16L 21/08 (2006.01)
F16L 35/00 (2006.01)

(52) U.S. Cl. ............. 285/38; 285/88; 285/91; 285/312; 285/402

(58) Field of Classification Search .............. 285/38, 285/83, 85, 87, 306, 312, 361, 396, 402, 285/88, 91
See application file for complete search history.

(56) References Cited

U.S. PATENT DOCUMENTS

| | | |
|---|---|---|
| 179,947 A | 7/1876 | O'Neil |
| 923,545 A | 6/1909 | Madison |
| 1,021,203 A | 3/1912 | Matchette |
| 1,121,147 A * | 12/1914 | Stiglich ............................ 285/88 |
| 1,146,822 A * | 7/1915 | Tapani ............................. 285/85 |
| 1,362,521 A * | 12/1920 | Zadora ............................ 285/85 |
| 1,871,421 A * | 8/1932 | Adams et al. ................. 285/101 |
| 2,230,098 A * | 1/1941 | Wurzburger .................... 285/90 |
| 2,333,496 A | 11/1943 | Townhill et al. |
| 2,340,965 A | 2/1944 | Kiesel |
| 2,571,236 A | 10/1951 | Hamilton |
| 2,679,407 A | 5/1954 | Badger |
| 2,679,408 A * | 5/1954 | Gustav et al. ................. 137/237 |
| 2,707,390 A | 5/1955 | Beretish |
| 2,722,399 A * | 11/1955 | Oetiker ...................... 251/149.6 |
| 2,794,961 A * | 6/1957 | Knight ........................... 439/314 |
| 2,818,279 A * | 12/1957 | Knapp ............................. 285/89 |
| 2,837,749 A * | 6/1958 | Lothar ............................. 4/515 |
| 2,943,869 A * | 7/1960 | Nordin ............................ 285/90 |
| 3,454,024 A | 7/1969 | McCullough |
| 3,470,524 A * | 9/1969 | Culver .......................... 439/317 |
| 3,542,047 A | 11/1970 | Nelson |
| 3,575,446 A * | 4/1971 | Brantley et al. ................ 285/85 |
| 3,664,634 A | 5/1972 | Guertin et al. |
| 3,821,970 A | 7/1974 | Affa |
| 3,949,787 A | 4/1976 | Milo |
| 4,010,633 A | 3/1977 | Hasha |
| 4,019,371 A | 4/1977 | Chaplin et al. |
| 4,133,347 A | 1/1979 | Mercer |
| 4,184,516 A | 1/1980 | Oesterritter et al. |
| 4,269,230 A | 5/1981 | Pepper |

(Continued)

*Primary Examiner* — James M Hewitt
(74) *Attorney, Agent, or Firm* — Workman Nydegger

(57) ABSTRACT

A fluid system component includes first and second elements configured to be removably engaged with each other to define a fluid passageway. The first element defines at least one groove. Correspondingly, the second element includes at least one engagement member configured to be received in a corresponding groove. The presence of a line pressure in the passageway substantially forecloses disengagement of the first and second elements until the fluid pressure in the fluid passageway has decreased to a predetermined magnitude. A handling and locking mechanism for selectively securing the second element relative to the first element is included. The locking mechanism includes a pin controlled by a crank arm assembly adjacent a collar handle. The crank arm assembly includes a crank arm handle that rotates to withdrawn the pin from the second element and which facilitates rotation of the first element relative to the second element.

20 Claims, 8 Drawing Sheets

U.S. PATENT DOCUMENTS

| | | |
|---|---|---|
| 4,271,865 A | 6/1981 | Galloway et al. |
| 4,436,228 A * | 3/1984 | Frey .................. 222/400.7 |
| 4,458,719 A * | 7/1984 | Strybel .............. 137/614.03 |
| 4,510,969 A | 4/1985 | Rodth |
| 4,567,924 A | 2/1986 | Brown |
| 4,575,130 A * | 3/1986 | Pemberton et al. ........ 285/38 |
| 4,614,201 A | 9/1986 | King et al. |
| 4,625,746 A | 12/1986 | Calvin et al. |
| 4,646,773 A | 3/1987 | Klop et al. |
| 4,827,960 A | 5/1989 | Nitzberg et al. |
| 4,901,751 A | 2/1990 | Story et al. |
| 4,909,280 A | 3/1990 | Friedrich et al. |
| 4,909,545 A | 3/1990 | Hohol |
| 4,926,680 A | 5/1990 | Hasha et al. |
| 5,026,099 A * | 6/1991 | Hendrix .................. 285/315 |
| 5,094,490 A * | 3/1992 | Shirey ..................... 285/24 |
| 5,170,659 A | 12/1992 | Kemp |
| 5,209,105 A | 5/1993 | Hasha et al. |
| 5,297,574 A | 3/1994 | Healy |
| 5,316,033 A | 5/1994 | Schumacher et al. |
| 5,404,909 A | 4/1995 | Hanson |
| 5,529,085 A | 6/1996 | Richards et al. |
| 5,699,822 A | 12/1997 | Bodhaine |
| 5,704,659 A | 1/1998 | Lunder |
| 5,826,610 A | 10/1998 | Bodhaine |
| 5,934,319 A | 8/1999 | Schumacher |
| 6,000,278 A | 12/1999 | Hystad |
| 6,082,392 A | 7/2000 | Watkins |
| 6,142,194 A | 11/2000 | McClaran |
| 6,155,294 A | 12/2000 | Cornford et al. |
| 6,511,103 B1 | 1/2003 | Defontaine |
| 6,871,804 B2 * | 3/2005 | Hagihara ................ 239/600 |
| 7,025,385 B2 * | 4/2006 | Drescher .................. 285/91 |
| 7,029,581 B2 | 4/2006 | Horan |
| 7,341,281 B2 * | 3/2008 | Guesnon et al. ........... 285/81 |
| 7,530,607 B2 * | 5/2009 | Luft ........................ 285/402 |
| 2004/0188335 A1 | 9/2004 | Horan |
| 2005/0046186 A1* | 3/2005 | Drescher ................ 285/330 |
| 2005/0206163 A1* | 9/2005 | Guesnon et al. ........ 285/402 |
| 2007/0108764 A1* | 5/2007 | Nicolino ................. 285/340 |

* cited by examiner

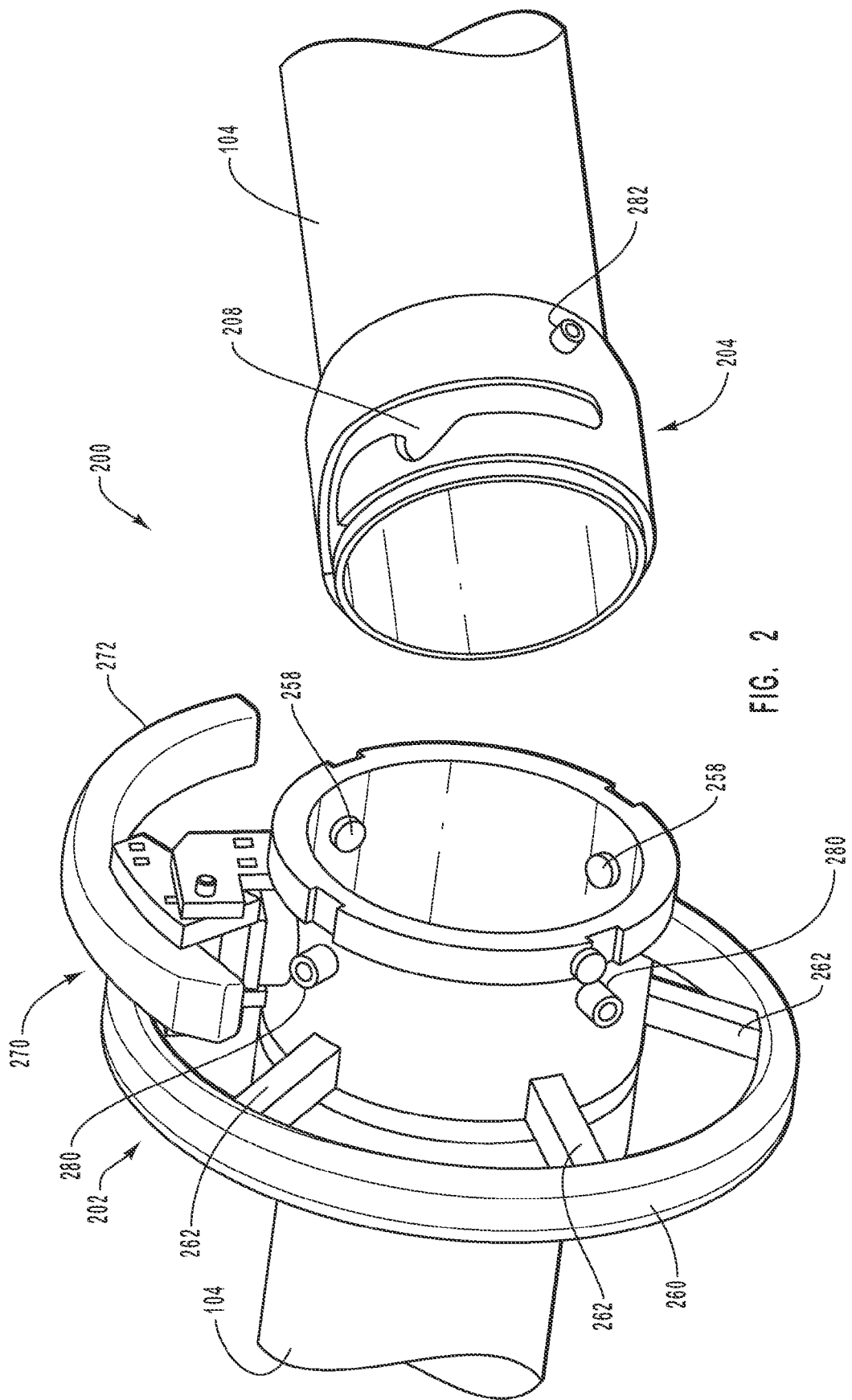

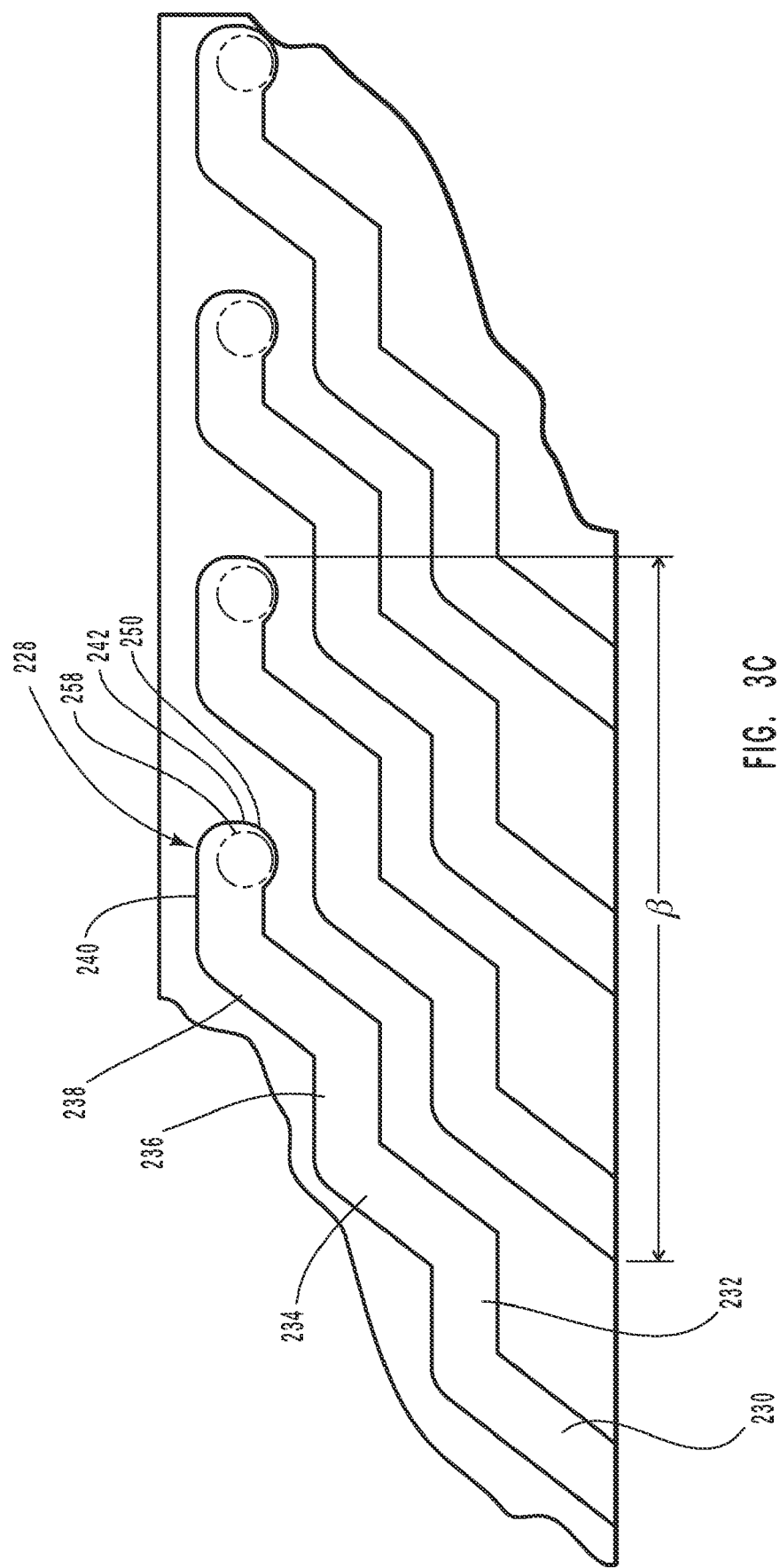

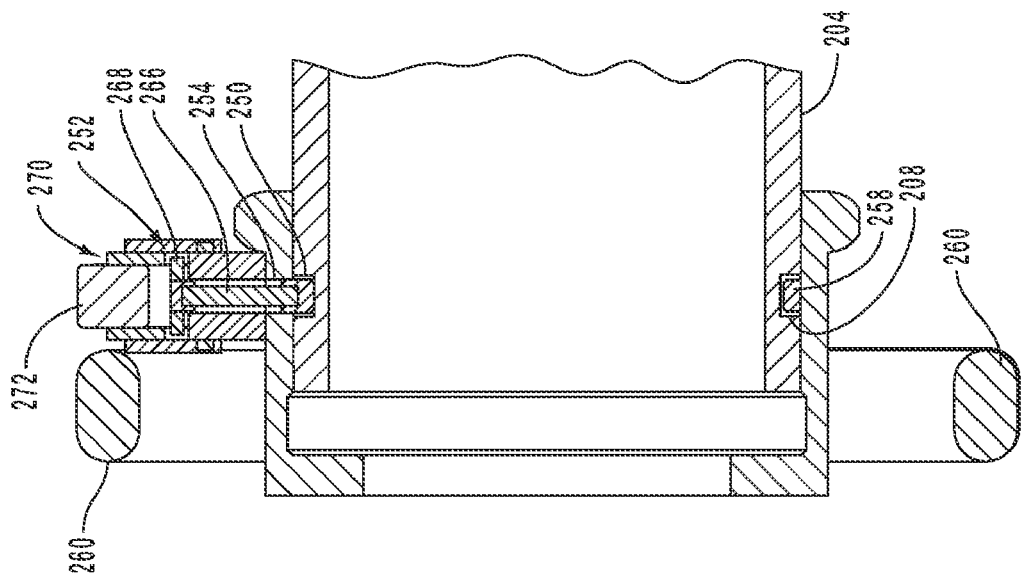
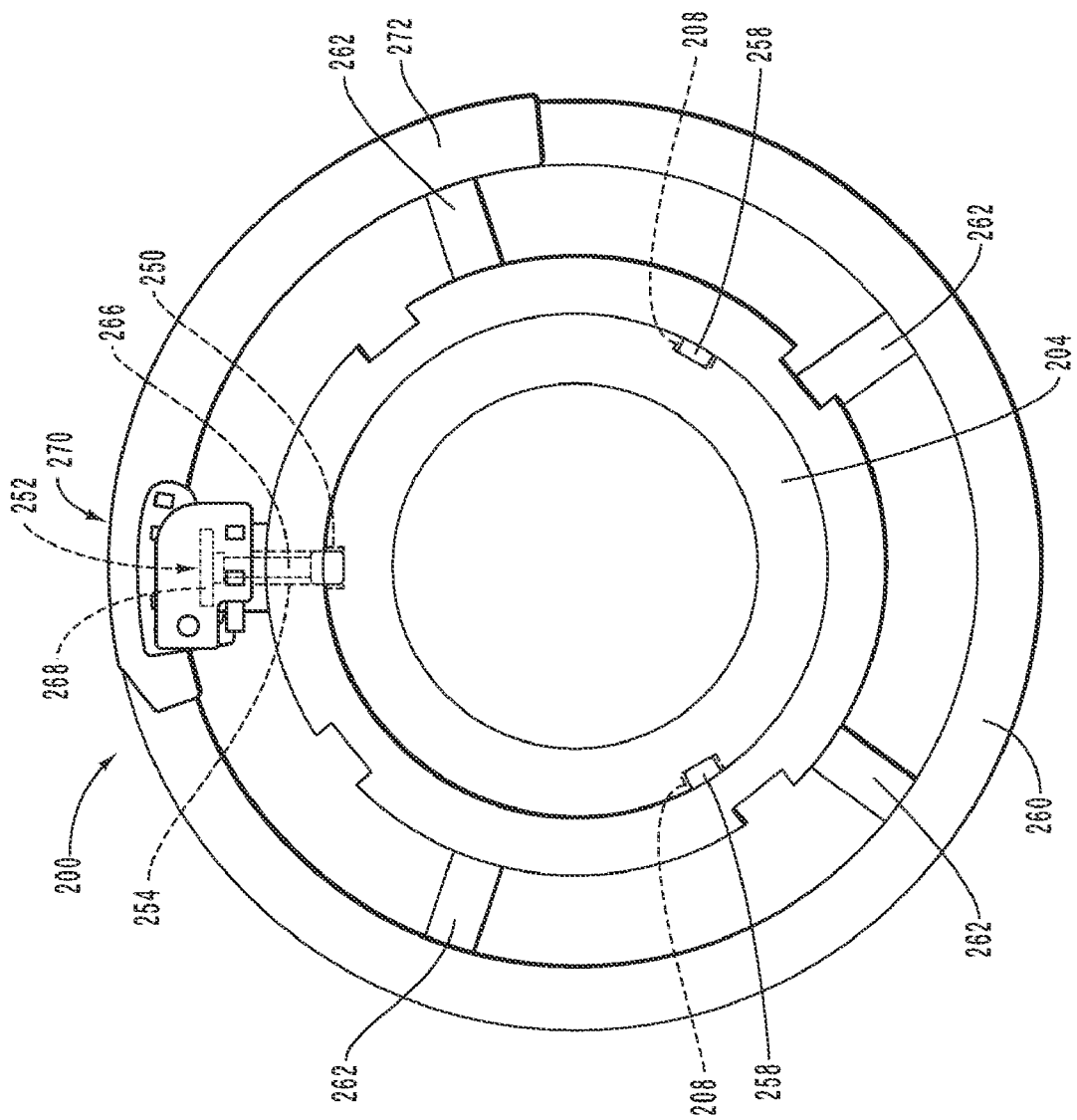

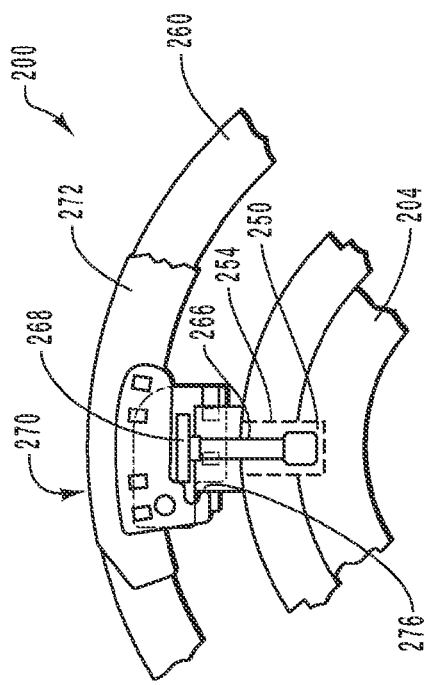
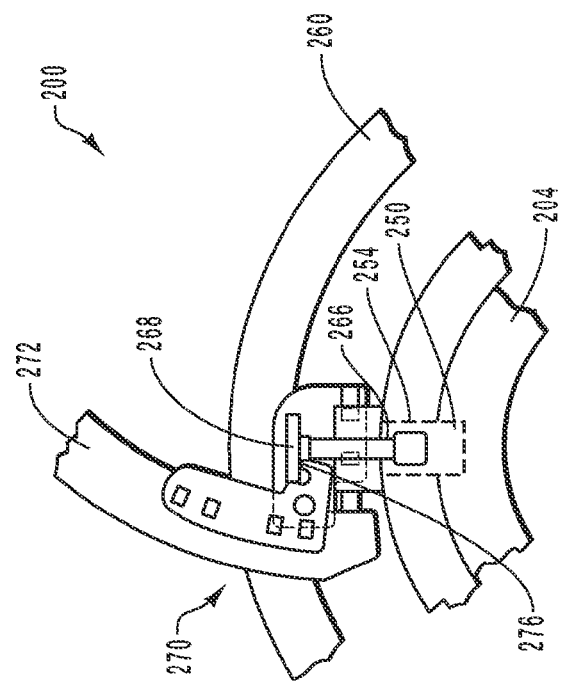
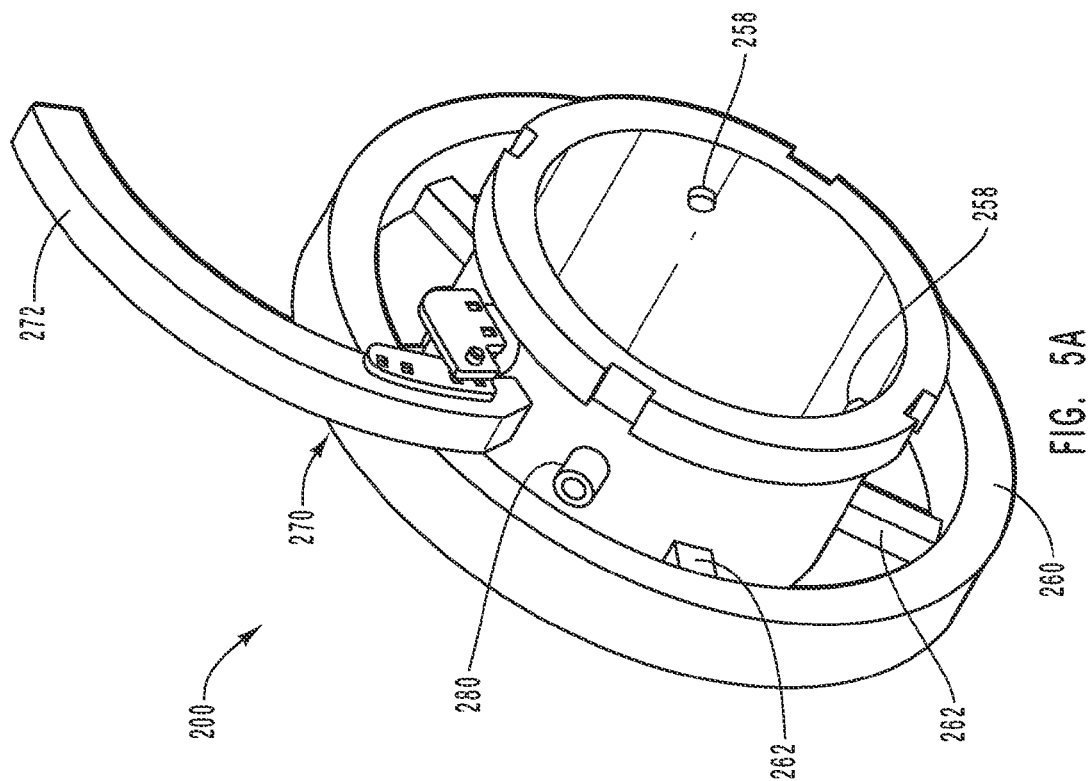

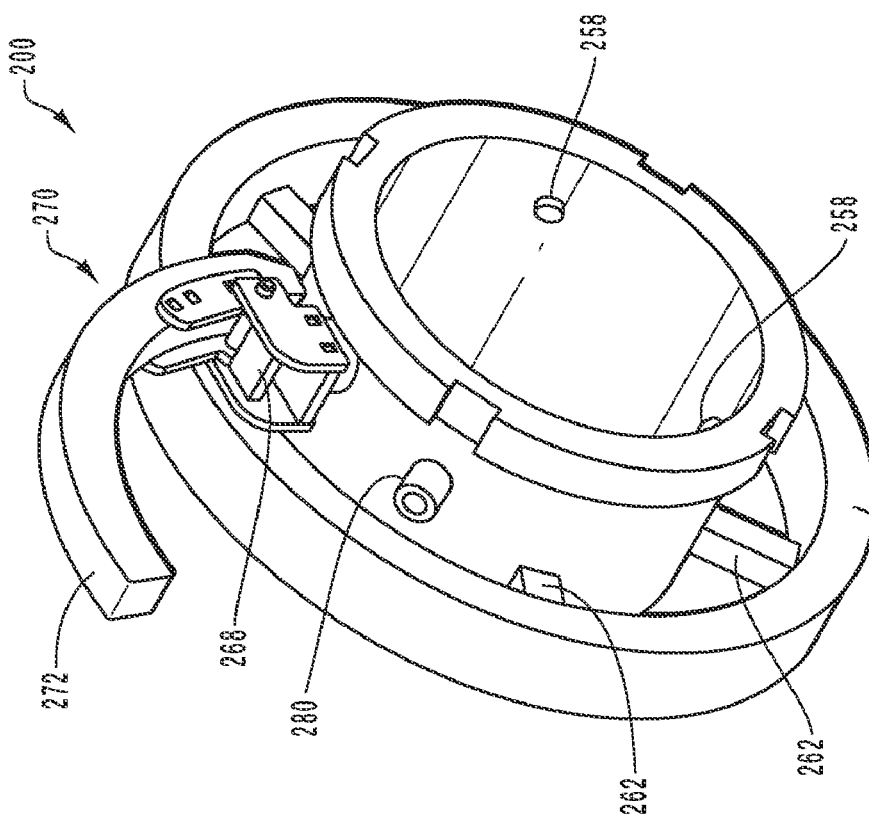
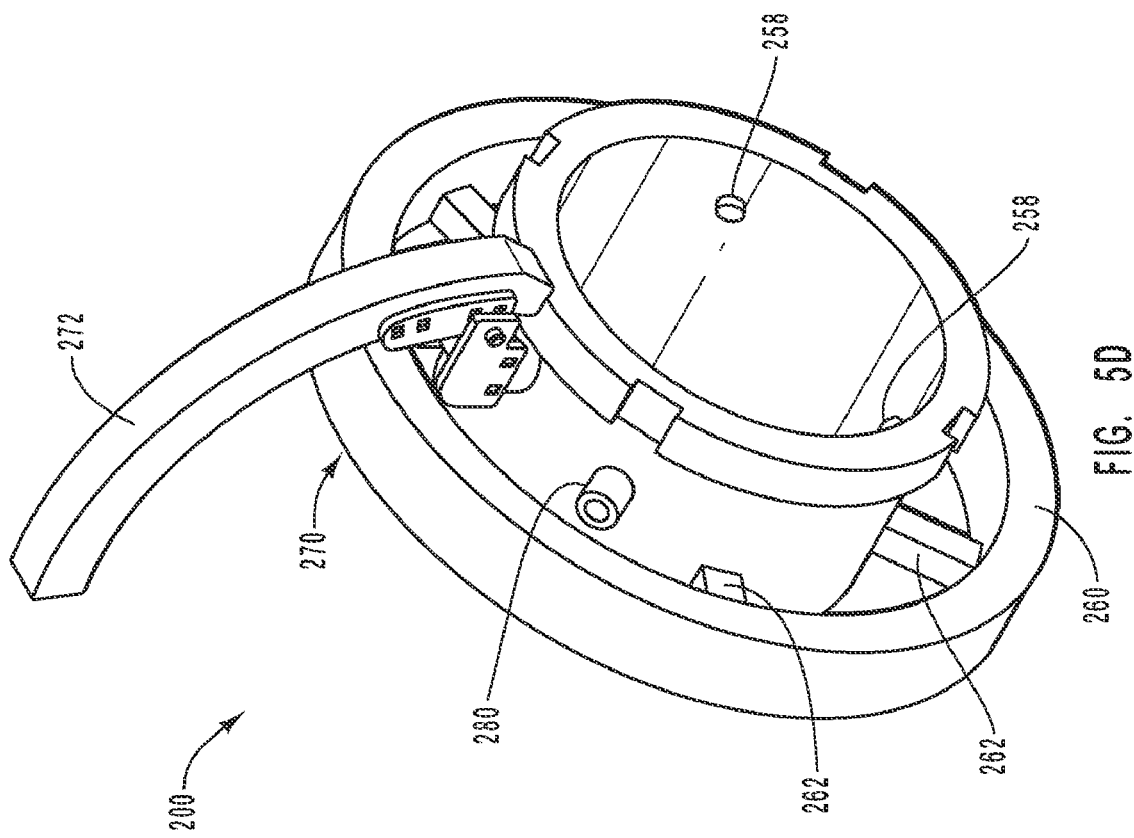
FIG. 5E
FIG. 5D

FLUID SYSTEM COUPLING WITH PIVOTING HANDLE ACTUATING MEMBER

BACKGROUND

1. Technical Field

The present invention relates generally to fluid system components. More particularly, embodiments of the present invention relate to coupling elements for fluid system components, in which the coupling elements facilitate quick and efficient coupling/decoupling of the fluid system components. Further, embodiments of the present invention relate to fluid system components which substantially prevent unintentional removal of a coupling element until the fluid system line pressure, or relative pressure differential, is reduced to a safe level.

2. Related Technology

In recent years, environmental concerns have been receiving significantly more attention, and various governmental agencies have responded by implementing stringent regulations to reduce or prevent pollution. Many of these regulations and concerns are directed towards those industries that transport fluids. For example, it is very difficult to transport a fluid without spilling or leaking some of the fluid into the environment. Thus, some environmental regulations require that only minimal leakage occur during handling, processing, or transportation of the fluid.

These environmental concerns become especially clear when considering the magnitude of the industries that handle hazardous fluids that, if allowed to escape even in relatively small quantities, can cause significant damage. There is a concern, therefore, to protect both the public and the environment from these types of fluids. While some fluids that are transported, such as water and milk, may not significantly pollute the environment when they are leaked or spilled, the loss of fluid into the environment is nevertheless viewed as a general waste of resources. More generally, the loss of fluid into the environment is not desirable even if the fluid does not contribute to pollution.

Within the transportation industry, a variety of different devices are used to transport a fluid from a source to a destination. These devices often use valve assemblies and conduits of various types to both connect the source to the destination as well as to manage fluid flow through the conduit. Typically, the conduit is pressurized to direct fluid toward the desired destination. With each transfer of fluid, there is a risk that leakage will occur due to human error, equipment malfunctions, or the like.

A common source of fluid leaks and fluid spills are the valves and other components and devices employed in fluid systems. By way of example, some valves may have leaks that permit flow through the valve even when the valve is secured in the closed position. In other instances, one or more joints defined by constituent elements of the valve, such as in the case of valves designed to be taken down in two or more pieces, and/or one or more joints at least partially defined by the valve, such as a valve-to-flange connection, may be defective, resulting in leakage of some or all of the system fluid. Unfortunately, problems such as these often do not manifest themselves until after flow has been established through the valve, component, or device.

Thus, in many instances, the system operator is limited in terms of the affirmative steps that can be taken to prevent a spill that may result from one or more defective joints, and oftentimes can only correct the spill when it occurs. This is true in the case of joints that are defectively assembled, or are otherwise defective upon assembly, as well as in the case of joints that become defective over a period of time due to operating, or other, conditions.

Another concern relates to the coupling and uncoupling of caps, valves, and other fluid system components that are employed, for example, in fuel, chemical, sewage, or other fluid transfer or processing systems. In particular, typical quick coupling devices are configured so that an operator can uncouple the mating halves of the quick coupling device, even in the presence of line pressure. Such an arrangement is problematic for a variety of reasons.

By way of example, in the event the line wherein the quick coupling device is located is charged with hazardous materials such as chemicals, sewage, fuels, or gases such as chlorine and methane, the operator performing the uncoupling operation could be seriously injured or killed when such materials escape from the line. Moreover, such hazardous materials are pollutants and significant time and cost is often involved in the cleanup of such materials.

A related problem with typical quick coupling devices concerns the pressure exerted by the material in the line wherein the quick coupling device is located. In particular, such pressure may cause the halves of the quick coupling device to rapidly come apart in an uncontrolled and dangerous manner, thereby injuring the operator and/or damaging nearby equipment. The forces resulting from such pressure can often be significant, even where the line pressure is relatively low. Thus, in a six inch diameter (nominal) pipe for example, even a relatively low pressure of ten (10) lbs./in.$^2$ ("psi") would exert a force of about one thousand (1000) pounds on a pipe cap attached to the end of the pipe.

Not only are such pressures dangerous, but operators may not have any way to verify, in advance of performing the uncoupling operation, whether or not the line is pressurized. Further, even if an operator is aware that pressure is present, the operator may, through inattentiveness, negligence, or for other reasons, nevertheless attempt to uncouple the quick coupling device.

Additionally, fluid system components are often exposed to extreme temperatures, either from the environment or the fluid flowing through the fluid system. The extreme temperatures can cause the various fluid system components to expand or contract. Further, the various fluid system components may be formed of disparate materials, each having a different thermal expansion rate. Thus as a first component expands or contracts at one rate, and a second component expands or contracts at a another rate, the two components may become frictionally locked together, thereby making it difficult to disengage one component from another.

In view of the foregoing, what is needed is a fluid system component having features directed to addressing the foregoing exemplary considerations, as well as other considerations not disclosed herein. More particularly, an exemplary fluid system component includes features directed to facilitating the secure engagement, and ready disengagement, of the mating halves of the fluid system component, while at the same time preventing intentional or accidental disengagement of the mating halves when a predetermined pressure is present in the line.

BRIEF SUMMARY

In general, embodiments of the invention are concerned with a fluid system component that, among other things, facilitates the secure engagement, and ready disengagement, of mating halves of the fluid system component, while at the same time preventing intentional or accidental disengagement of the mating halves when a predetermined pressure is present in the line.

In one exemplary embodiment of the invention, a fluid system component includes a coupling. The coupling itself can include a sleeve coupled to a pipe and a collar. The collar can include a collar handle and at least one engagement member that facilitate selective engagement of the collar with the sleeve. The collar can be rotated relative to the sleeve, in a first direction, thereby disengaging the engagement member from the groove. Disengagement of the engagement member from the groove can also disengage the collar from the sleeve and/or open the pipe. The sleeve and collar can be configured such that the engagement member fully disengages from the groove only when the pipe has a pressure below a certain level, and such that at or above that level, the engagement member is substantially prevented from fully disengaging from the groove. The collar can be coupled to the sleeve by positioning the engagement member within the groove and rotating the collar relative to the sleeve in a second direction that is opposite the first direction.

Optionally, the coupling includes a locking mechanism that prevents axial rotation of the collar relative to the sleeve. Such a locking mechanism can include a pin that extends through an aperture in the collar and/or is received within a recess in the sleeve. The pin and/or locking mechanism may also include a crank arm handle that facilitates retraction of the pin from the recess in the sleeve. The groove in the sleeve can be formed in an outer surface thereof, and can include an entry segment, a circumferential segment, and/or a terminal segment. In one example, the terminal segment is connected to the intermediate segment and is offset therefrom at an acute angle. The terminal segment may thus be adapted to receive an engagement member and prevent axial rotation of the collar relative to the sleeve.

The pin can include a head, or other protruding structure, which can be engaged by a cam surface on the crank arm handle. As the crank arm handle is pivoted in a first direction, the cam surface can engage the head of the pin, thereby causing the distal end of the pin to be withdrawn from the recess in the sleeve. The collar can then be rotated relative to the sleeve to disengage the collar from the sleeve. The crank arm handle can be rotated in a plurality of directions to facilitate movement and manipulation of the collar.

According to another embodiment, a fluid system component includes a coupling having a coupling member, a fluid conduit, and a locking member. The coupling member includes an engagement member and the fluid conduit has a sleeve defining a groove. The sleeve is configured to be received at least partially by the coupling member. Additionally, the groove extends at least partially around the circumference of the sleeve and has a terminal portion notched in the side of the groove. The groove itself is adapted to receive the engagement member and facilitate engagement of the coupling member with the sleeve, and such that the terminal portion, when it receives the engagement member under line pressure, substantially prevents the coupling member from rotating relative to the fluid conduit. The locking member is movably connected to the coupling member and is adapted to engage the sleeve and prevent axial rotation of the coupling member relative to the sleeve.

The locking member can be disengaged from the sleeve and the coupling member can be rotated axially relative to the sleeve to fully disengage the engagement member from the sleeve, although when line pressure is above a predetermined amount, it substantially locks the engagement member in the terminal segment to prevent full disengagement. After disengagement, the coupling member can be re-engaged with the sleeve by positioning the engagement member in the groove and rotating the coupling member until the engagement member is positioned within, adjacent, or beyond the terminal segment. The locking member can then be engaged with the sleeve to selectively secure the coupling member to the sleeve.

Any suitable coupling member may be used. For instance, the coupling member may be a collar, an end cap, a portion of a valve, or another coupling member. In another case, the coupling member includes a second fluid conduit for introducing a pressurized fluid into the first fluid conduit. For instance, the second fluid conduit can be a hose that allows air or another fluid to flow into the first fluid conduit in a direction that is opposite the line pressure. Such fluid may, for example, force a cleaning device, known as a pig, in a direction opposite the line pressure to, for example, clean, dewater, dry, or inspect the pipe.

In another embodiment, a fluid system is described and includes a coupling adapted for mounting to a fluid conduit. The coupling can include an engagement member and a locking member, and can have multiple positions relative to the fluid conduit. For instance, in a first locked position, the engagement member can be received within a circumferential segment of a groove in the fluid conduit while the locking mechanism is received within the terminal segment of the groove. In this manner, the locking mechanism can substantially prevent rotation of the coupling relative to the fluid conduit. In a second locked position, the engagement member can be received within the terminal segment while the locking member is retracted from the groove, such that the engagement member substantially prevents rotation of the coupling relative to the fluid conduit. Additionally, the coupling may be adapted to rotate from the first locked position to the second locked position when the locking member is retracted from the groove and when line pressure exists in the fluid conduit.

An exemplary embodiment of the present invention further provides a locking mechanism on the fluid system component that substantially prevents takedown of the fluid system component as a result of unintentional or accidental rotation of the fluid system components. The locking mechanism includes a locking pin that extends through the wall of a first portion of the fluid system component and into a recess defined in the outer wall of a second portion of the fluid system component. The locking pin is movably connected to the first of the fluid system components and may be biased so that a distal end of the locking pin protrudes from the inner wall of the first portion of the fluid system component to engage the recess in the second portion of the fluid system component. The engagement between the locking pin and the recess in the second portion of the fluid system component prevents relative rotation of the first and second portions of the fluid system component, and thus takedown of the fluid system component.

An exemplary locking mechanism of the fluid system component further includes a crank arm handle at or near the proximate end of the locking pin. The crank arm handle allows a user to withdraw the distal end of the locking pin from a recess in the second portion of the fluid system component. The locking pin can include a head, or other protruding structure, which can be engaged by a cam surface on the crank arm handle. As the crank arm handle is rotated in a first direction, the cam surface engages the head of the locking pin, thereby causing the distal end of the locking pin to be withdrawn from the recess in the second portion of the fluid system component. Once the locking pin is disengaged from the recess in the second portion of the fluid system component, the portions of the fluid system component can be rotated relative to each other so that they can be disengaged from each other. The crank arm handle can facilitate movement and manipulation of the fluid system component, such as rotation of the first portion relative to the second portion of the fluid system component. For example, when rotated in the first direction, the crank arm handle can be used to increase the torque applied to the fluid system component to facilitate movement of the fluid system component. The crank arm handle can also be rotated in a second direction to facilitate movement of the fluid system component in multiple directions. The crank arm handle can be biased to a closed or locked position to reduce to profile of the assembly.

A collar handle can also be formed on the outer wall of the first portion of the fluid system component. The collar handle can facilitate movement and manipulation of the fluid system component, such as rotation of the first portion relative to the second portion of the fluid system component. The collar handle is, in one example, adjacent to the crank arm handle, which is on or near the proximate end of the locking pin.

These and other aspects of embodiments of the present invention will become more fully apparent from the following description and appended claims.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 2 is a perspective view of an embodiment of a coupling which includes a collar and a sleeve that can be releasably connected to each other and which can be incorporated into a fluid system such as that of FIG. 1;

FIG. 3C side view illustrating aspects of yet another exemplary groove arrangement for a coupling such as that of FIG. 2;

FIG. 4A is an end view of the collar of FIG. 2;

FIG. 4B is a cross-sectional side view of the coupling of FIG. 2 with the collar fully engaged with the sleeve;

FIG. 5A is a perspective view of the collar of FIG. 2, illustrating a crank arm handle in an extended position to withdraw a locking pin from within the collar and to facilitate axial rotation of the collar for quick and easy coupling/decoupling of the collar and the sleeve;

FIG. 5B is a partial end view of the collar of FIG. 2, illustrating the various details of the engagement of the locking pin of the collar with the sleeve when the crank arm handle is in a lowered position;

FIG. 5C is another partial end view of the collar of FIG. 2, illustrating the various details regarding the disengagement of the locking pin of the collar from the sleeve when the crank arm handle is in an extended position;

FIG. 5D is another perspective view of the collar of FIG. 2, illustrating the crank arm assembly, including the crank arm handle, rotating about the locking pin of the collar to facilitate quick and easy coupling/decoupling of the collar and the sleeve;

FIG. 5E is another perspective view of the collar of FIG. 2, illustrating the crank arm assembly, including the crank arm handle, fully rotated about the locking pin of the collar to facilitate quick and easy coupling/decoupling of the collar and the sleeve.

DETAILED DESCRIPTION

Reference will now be made to figures wherein like structures will be provided with like reference designations. It is to be understood that the drawings are diagrammatic and schematic representations of various embodiments of the invention, and are not to be construed as limiting the present invention, nor are the drawings necessarily drawn to scale.

Figure 1:
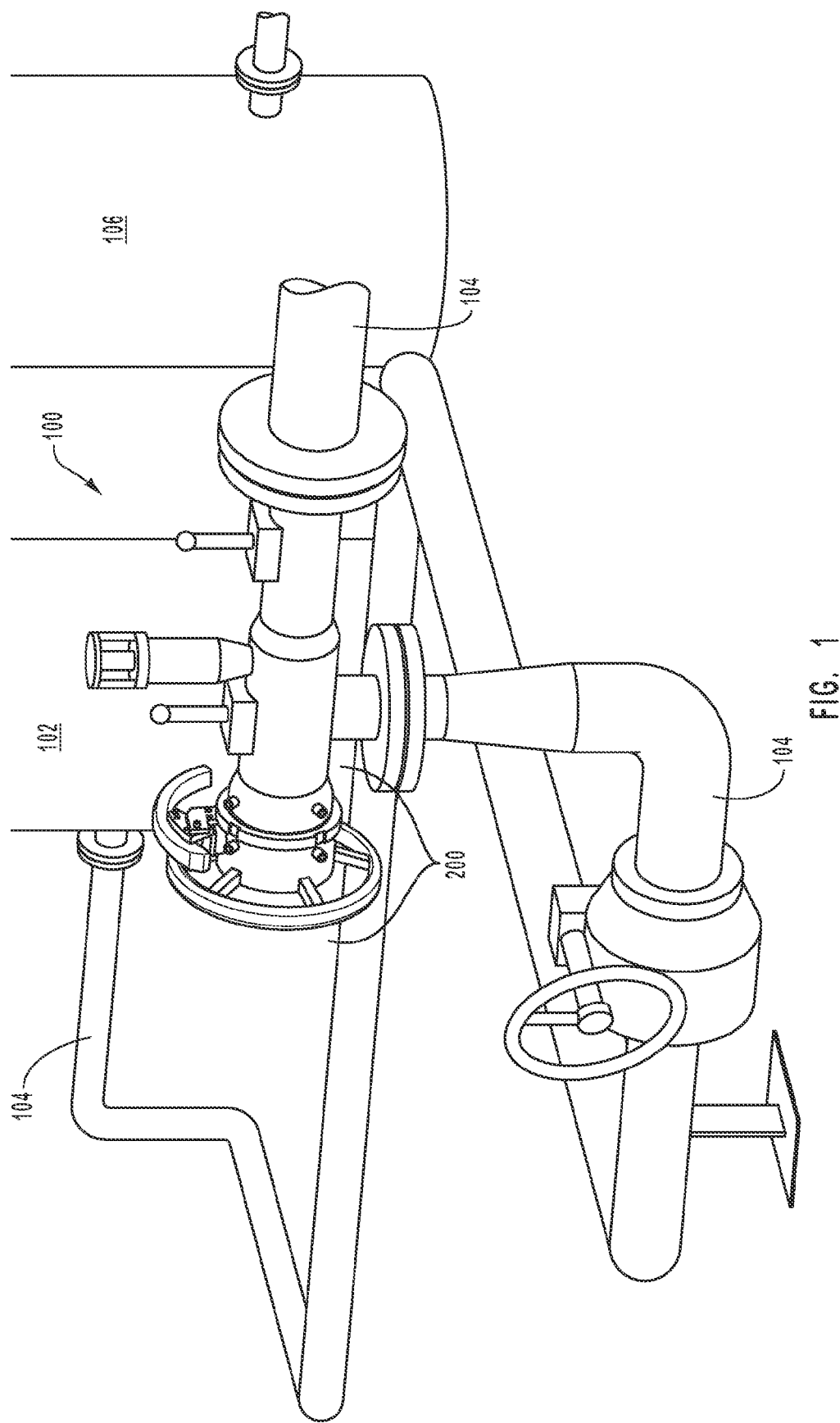
FIG. 1 depicts an exemplary operating environment for at least some embodiments of the present invention.

With reference first to FIG. 1, a portion of one embodiment of a fluid system is indicated generally at 100. Note that, as contemplated herein, "fluid" is not limited to liquids, but can include a variety of other compositions. For example, the term "fluid," as used herein, expressly includes liquids, gases, liquid-gas combinations, slurries, liquid-solid combinations, gas-solid combinations, and liquid-solid-gas combinations. In the exemplary embodiment depicted in FIG. 1, fluid system 100 includes a fluid source 102 in fluid communication with one or more fluid conduits 104. According to some example embodiments at least one of fluid conduits 104 may comprise a coupling 200. Fluid conduits 104 are, in the illustrated embodiment, configured for selective fluid communication between fluid source 102 and fluid destination 106.

As discussed elsewhere herein, it will be appreciated that coupling 200 may be located, either in part or in its entirety, at fluid source 102, at fluid destination 106, or at an intermediate position between fluid source 102 and fluid destination 106. It will also be appreciated that the term "conduit" can include any structure or device adapted to facilitate transportation of a fluid, wherein such structures and devices include, but are not limited to, pipes, hoses, tubes, channels, ducts, or the like. Furthermore, fluid conduits 104, fluid source 102, and fluid destination 106 may be constructed of one or a combination of any of a variety of materials, including, but not limited to, metals, plastics, rubbers, composites, organic materials, and the like.

With continuing reference to FIG. 1, fluid source 102 and fluid destination 106 are illustrated as aboveground tanks. However it will be appreciated that fluid source 102 and/or fluid destination 106, may comprise any of a variety of different static or mobile structures and/or vehicles. Such structures and vehicles include, but are not limited to, air, water, or land vehicles, such as, but not limited to, trucks, boats, automobiles, motorcycles, ships, railcars, aircraft, and the like, as well as structures such as tanks, reservoirs, and the like.

In operation of fluid system 100, a pressure differential can be established between fluid source 102 and fluid destination 106 so as to cause flow of the fluid through fluid conduits 104 in a desired direction. It will be appreciated that the pressure differential may be established in such a way as to cause flow to proceed in one or more directions, such that fluid may flow from fluid source 102 towards fluid destination 106 and/or from fluid destination 106 towards fluid source 102. The pressure differential may result from the force of gravity, or may alternatively be established by various types of equipment and devices including, but not limited to, pumps and the like.

Directing attention now to FIGS. 2-5E, details are provided concerning exemplary embodiments of a coupling, generally denoted at 200, which facilitates ready and convenient engagement and disengagement of fluid system components. As illustrated in FIG. 2, for example, coupling 200 includes a sleeve 204 that is configured to receive one end of fluid conduit 104 and at least partially define a fluid passageway. In this example, coupling 200 also includes a collar 202 configured to be positioned on sleeve 204, and which at least partially defines the fluid passageway in connection with fluid conduit 104. Collar 202 and sleeve 204 can collectively allow for quick and convenient engagement and disengagement of fluid system components. Additionally, collar 202 and sleeve 204 can include various features which substantially prevent fluid leakage and/or undesirable take down of fluid system 100.

More particularly, as illustrated in FIG. 2, sleeve 204 can be connected to one end of fluid conduit 104. In one embodiment, for example, sleeve 204 is adapted to receive the end of fluid conduit 104 therein, and to be coupled thereto. It will be appreciated, however, that sleeve 204 may have other configurations. For example, sleeve 204 may be adapted to be received within fluid conduit 104 and/or may be formed directly on fluid conduit 104. In this manner, sleeve 204 may be integrally formed with fluid conduit 104 or may be a separate, and optionally removable, attachment thereto. In an example in which sleeve 204 receives fluid conduit 104, sleeve 204 and fluid conduit 104 can be configured such that the interior surface of sleeve 204 is compatible with the exterior surface of fluid conduit 104. However, it is desirable in some cases to construct sleeve 204 in such a way that a gap is introduced between the interior surface of sleeve 204 and the exterior surface of fluid conduit 104 so as to accommodate, for example, any differences in the thermal expansion rates of sleeve 204 and fluid conduit 104. Furthermore, where sleeve 204 and fluid conduit 104 are separately formed, sleeve 204 may be attached to fluid conduit 104 in any suitable manner, such as by methods including, but not limited to, welding, brazing, and soldering. In at least one embodiment, sleeve 204 and fluid conduit 104 each include mating threads so that sleeve 204 can be removably attached to fluid conduit 104. As noted above, it will be appreciated that fluid conduit 104 and sleeve 204 can also be formed as a single integral piece.

Generally, sleeve 204 comprises a metallic material that, in at least some instances, is chemically and thermally compatible with fluid conduit 104. Exemplary materials for sleeve 204 include, but are not limited to, copper and its alloys, steels, iron, aluminum and its alloys, and titanium and its alloys. Moreover, sleeve 204 may be machined, extruded, or cast. Other suitable materials and/or construction methods may additionally, or alternatively, be employed.

Figure 3A:
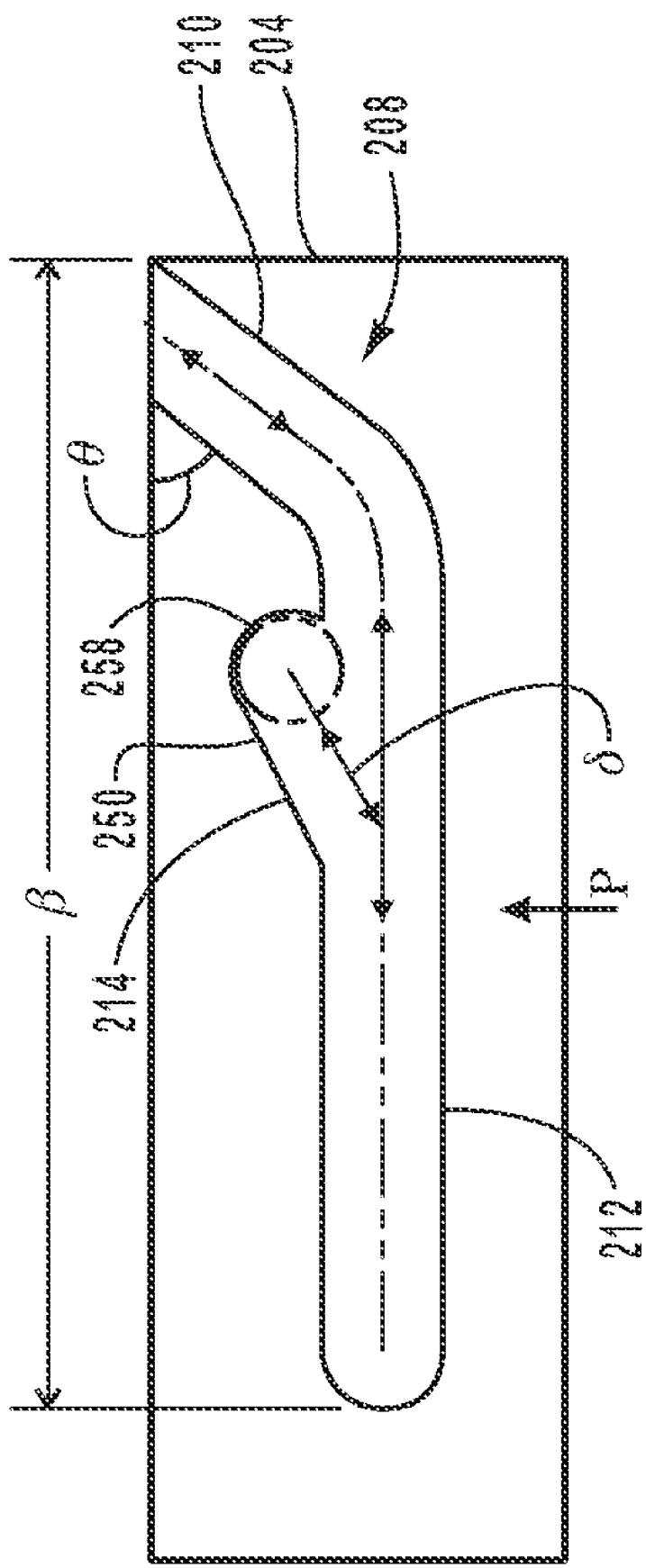
FIG. 3A is a side view illustrating aspects of an exemplary groove arrangement for a coupling such as that of FIG. 2.

As indicated in FIGS. 2 and 3A, sleeve 204 defines at least one groove 208. In some embodiments, a plurality of grooves are formed and are configured and arranged to engage corresponding structure of collar 202, as discussed in further detail herein. In one example embodiment, each of the one or more grooves 208 can include an entry segment 210 that substantially begins at and opens to the front edge of sleeve 204, and which is connected to a circumferential segment 212, and/or a terminal segment 214. In the illustrated embodiment, for example, entry segment 210 cooperates to create an acute entry angle θ with respect to the front edge of sleeve 204, although in other embodiments entry segment 210 and the front edge of sleeve 204 can create an entry angle θ that is an obtuse or right angle. Where the entry angle θ is acute, such as is illustrated in FIG. 3A, any suitable angle may be used. For example, according to one embodiment, the entry angle θ is between about thirty and about sixty degrees, although it will be appreciated that entry angle θ may also be less than thirty degrees or greater than sixty degrees.

As further seen in FIGS. 2 and 3A, circumferential segment 212 can be connected to an internal end of entry segment 210 and can extend therefrom circumferentially at least partly around sleeve 204. In the illustrated embodiment, circumferential segment 212 extends substantially parallel to the front edge and circumference of sleeve 204, and thus at an obtuse angle relative to entry segment 210. It will be appreciated that the illustrated embodiment is exemplary only, however, and in other embodiments circumferential segment 212 can extend at an angle relative to the front edge and/or circumference of sleeve 204.

Circumferential segment 212 and/or entry segment 210 may further be connected to terminal segment 214. In the illustrated embodiment, terminal segment 214 extends from circumferential segment 212, although in other embodiments terminal segment 214 may instead extend from entry segment 210 or may extend from the junction between entry segment 210 and circumferential segment 212. As shown in FIG. 3A, in one example embodiment, terminal segment 214 may cooperate with circumferential segment 212 to define an offset angle δ that aids in the engagement of collar 202 with sleeve 204 generally in the manner described herein. For instance, offset angle δ may be between about twenty and about seventy degrees, in one embodiment, although offset angle δ may, in other embodiments, be less than twenty degrees or more than seventy degrees. In the embodiment illustrated in FIG. 3A, terminal segment 214 is a substantially J-shaped notch disposed in the side of circumferential segment 212 adjacent the front edge of sleeve 204. Thus, according to one embodiment, circumferential segment 212 and terminal segment 214 cooperate to create offset angle δ such that terminal segment 214 extends toward the front edge of sleeve 204. As seen in FIG. 3A and discussed elsewhere herein, the hook portion of the substantially J-shaped terminal segment 214 is adapted to engage a pin or engagement member 258 therein.

As noted herein, one or more grooves 208 can be formed in sleeve 204 or fluid conduit 104. Accordingly, any of a variety of different numbers of grooves 208 may be used. In one embodiment, for instance, three grooves 208 are machined, cast, or otherwise formed, in the outer surface of sleeve 204. In such an example, each groove 208 can extend at least partially around sleeve 204. For instance, each of three grooves may describe an arc β of about one-hundred twenty (120) degrees around the circumference of sleeve 204. In this manner, each circumferential segment 212 may end at a point that is about aligned with the start of another entry segment 210. In other embodiments, however, the groove 208 may have different lengths. For instance, each or any of three grooves 208 may extend an arc β less than about one-hundred twenty (120) degrees. In the case of other exemplary embodiments, such as that illustrated in FIG. 3C for example, arc β described by each groove may be such that the grooves substantially overlap each other.

It should be noted that the embodiment of grooves 208 illustrated in FIGS. 2 and 3A is exemplary only and aspects of grooves 208 such as, but not limited to, the size, number, geometry, arrangement, arc length β, entry angle θ, offset angle δ, and disposition of one or more of grooves 208 may be varied in accordance with the requirements of a particular application. Accordingly, such exemplary embodiment should not be construed to limit the scope of the invention in any way. For example, FIGS. 3B and 3C illustrate alternative embodiments of grooves, generally demoted at 218 and 228, respectively.

Figure 3B:
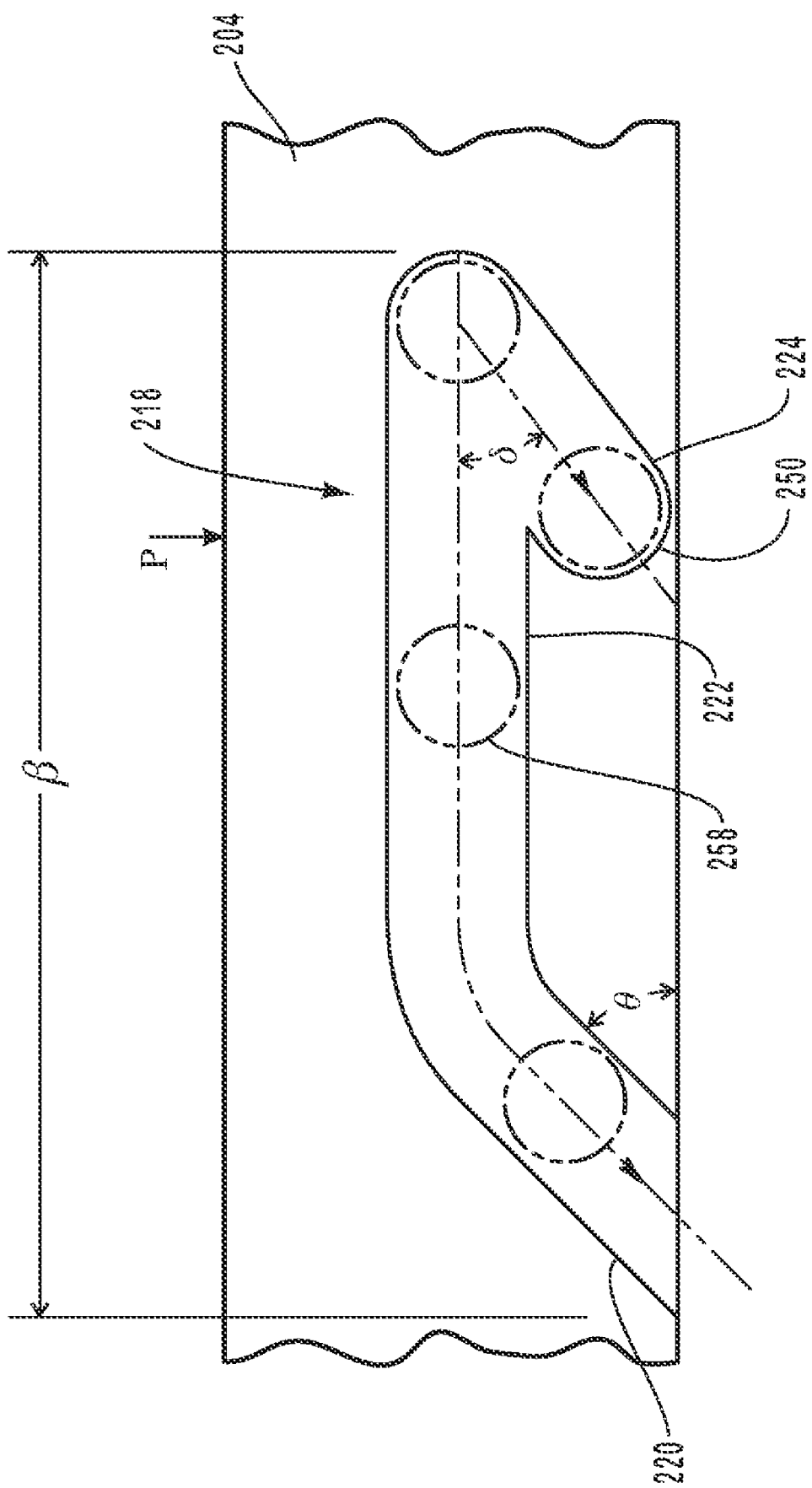
FIG. 3B is a side view illustrating aspects of another exemplary groove arrangement for a coupling such as that of FIG. 2.

In particular, FIG. 3B illustrates an example embodiment of groove 218, which includes three segments, namely, an entry segment 220 that opens at the front edge of sleeve 204, a circumferential segment 222, and a terminal segment 224. In the embodiment illustrated in FIG. 3B, terminal segment 224 is located at, and extends from, the end of circumferential segment 222 opposite an end of circumferential segment 222 that extends from entry segment 210. In the illustrated embodiment, terminal segment 224 extends from the end of circumferential segment 222 and toward the front edge of sleeve 204. Terminal segment 224 and circumferential segment 222 cooperate to create offset angle δ so that circumferential segment 222 and terminal segment 224 cooperate to form a substantially J-shaped groove or notch. In light of the disclosure herein, it will be appreciated that the fluid pressure within the fluid passageway cooperates with terminal segment 224 to couple collar 202 and sleeve 204 together until the fluid pressure within the fluid passageway is reduced below a predetermined level.

In yet other embodiments of the grooves of sleeve 204, a terminal segment may be generally perpendicular or parallel to a longitudinal axis of sleeve 204. Moreover, the number and arrangement of intermediate segments in a groove, or grooves, may be varied as desired. In some alternative embodiments, grooves are defined by a structure that is discrete from, but attached or attachable to sleeve 204.

FIG. 3C illustrates yet another exemplary embodiment of grooves 228 defined by, or included in or on, sleeve 204, and which include a plurality of segments, including an entry segment 230. Notably, in contrast with other embodiments such as those illustrated in FIGS. 3A and 3B, grooves 228 further include five intermediate segments denoted, respectively, 232, 234, 236, 238 and 240 as well as a terminal segment 242.

Although in the exemplary embodiment illustrated in FIG. 3C, grooves 228 are illustrated with five intermediate segments, one or more aspects of grooves 228 may be varied as necessary to suit a particular application. For example, intermediate segments 232, 236 and 240 are, in some embodiments, generally parallel to each other, while intermediate segments 234 and 238 are generally parallel to each other and to entry segment 230. In yet other embodiments, such intermediate segments are disposed in a non-parallel arrangement. Moreover, other features such as, but not limited to, the length, width and depth of one or more grooves 228 may be modified as required or desired. Additionally, while intermediate segments 232, 234, 236, 238 and 240 are described as intermediate segments, they can also be effectively considered a single circumferential segment which extends from entry segment 230 to terminal segment 242.

As illustrated in FIGS. 3A-4B, sleeve 204 also, in some embodiments, defines a pin recess 250 formed in the wall of sleeve 204 and is configured to receive an end of a pin 252 therein, as described more fully hereinafter. In the illustrated embodiment, for example, pin recess 250 extends partially through a wall of sleeve 204. However, it will be appreciated that pin recess 250 may, in other embodiments, extend completely through a wall of sleeve 204 so as to form a hole therein. Pin recess 250 is optionally sized and configured to receive a portion of pin 252 therein, and can be positioned in sleeve 204 so as to align with a pin aperture 254 in collar 202 when collar 202 has fully engaged sleeve 204, as best illustrated in FIG. 4B. Additionally, pin recess 250 can comprise the terminal segment within the groove of the sleeve (e.g., terminal segment 214 of groove 208, as seen in FIG. 3A).

In correspondence with the grooves 208 (or grooves 218 or 228 from FIGS. 3B and 3C) defined by sleeve 204, collar 202 can include a plurality of engagement members 258, each of which is configured and arranged to be received within a corresponding groove 208 and travel therealong, as suggested by the exemplary travel path illustrated in FIG. 3A. To that end, each engagement member 258, may be a bolt, roller or other suitable member, and can have a diameter and/or thickness that generally corresponds with the width and/or depth, respectively, of a corresponding groove 208. Engagement members 258 are illustrated as disposed within the interior of collar 202, although other configurations are contemplated. It will also be appreciated that engagement members 258 can be attached to collar 202 in a variety of ways including, but not limited to, welding, brazing, soldering, and the like. Alternatively, collar 202 and engagement members 258 can be formed as an integral piece, or attached or formed in any other suitable manner. In some embodiments of the invention, bearings or similar structures or devices are provided to facilitate ready and reliable rotation of the engagement members 258.

With continuing attention to FIG. 2, and with additional attention to FIGS. 4A-4B, further details are provided concerning certain aspects of the illustrated embodiment of collar 202. In particular, collar 202 includes a collar handle 260 that extends, in this embodiment, around the entire circumference of collar 202. However, it will be appreciated that a collar handle can comprise one or more collar handles which are not required to extend fully around collar 202. In the embodiment illustrated in FIGS. 4A-4B, collar handle 260 is coupled to collar 202 by support members 262. It will be appreciated that the number, shape, and/or size of support members 262 employed to couple collar handle 260 to collar 202 can be varied while remaining within the spirit and scope of the invention. Support members 262 can also be attached to collar handle 260 and/or collar 202 in a variety of ways including, but not limited to, welding, brazing, soldering, and the like. Alternatively, collar handle 260, support members 262, and/or collar 202 can be formed as an integral piece, or attached or formed in any other suitable manner.

As illustrated in FIGS. 4A and 4B, collar 202 can define a pin aperture 254. In one embodiment, pin aperture 254 is formed through a wall of collar 202, while in other embodiments the pin aperture may extend through a guide that is not fully within a wall of collar 202, but is nevertheless considered a pin aperture. Pin aperture 254 can be sized and configured to receive a portion of pin 252 therethrough, and can be further sized and configured so as to allow the pin shaft 266 to rotate and/or translate within pin aperture 254. Pin aperture 254 in this embodiment is positioned in collar 202 so as to be substantially aligned with pin recess 250 of sleeve 204 when collar 202 has fully engaged sleeve 204. For example, pin aperture 254 is substantially aligned with pin recess 250 when pin 252 can be received in pin recess 250 of sleeve 204 and through pin aperture 254 of collar 202, as illustrated in FIGS. 4A and 4B.

FIGS. 4A-5E also illustrate various aspects of collar 202, which may be configured to substantially prevent axial rotation of collar 202 with respect to sleeve 204 when a line pressure above a predetermined level is present in the fluid passageway, and which may be configured to facilitate axial rotation of collar 202 when the line pressure within the fluid passageway is below the predetermined level.

In the illustrated embodiment, for instance, collar 202 includes a pin 252 having a pin shaft 266 and a pin head 268. Furthermore, collar 202 also includes a crank arm assembly 270 operatively associated with pin 252. As described herein, pin 252 is configured to be received within pin aperture 254 and pin recess 250 to prevent axial rotation of collar 202 relative to sleeve 204. Crank arm assembly 270 may be configured to enable a user to selectively move pin 252, such as to selectively remove pin 252 from pin recess 250 and/or pin aperture 254, or to insert pin 252 into pin aperture 254 and/or pin recess 250. For example, crank arm assembly 270 may be sized and/or shaped to accommodate a particular user, or to accommodate a particular size of fluid conduit 104. It may be desirable, for instance, for crank arm assembly 270 to be larger if the fluid conduit 104 is larger or smaller if the fluid conduit 104 is smaller.

As illustrated in FIGS. 4A and 4B, pin shaft 266 can be coupled to pin head 268, which, in turn, can be engaged by crank arm assembly 270 so as to cause pin shaft 266 to move as crank arm assembly 270 moves. For example, as a user exerts a force on a distal end of crank arm handle 272 of crank arm assembly 270 so as to extend it in a radial direction away from sleeve 204, pin 252 can also be caused to correspondingly move in a radial direction and away from sleeve 204. In particular, crank arm handle 272 is pivotally coupled to collar 202 by way of pivot 274. Pivot 274 enables crank arm handle 272 to rotate thereabout, thereby allowing the distal end of crank arm handle 272 to move from the position illustrated in FIGS. 4A and 5B to the position illustrated in FIGS. 5A and 5C, for example.

As crank arm handle 272 rotates about pivot 274, cam surface 276 of crank arm handle 272 engages pin head 268 and causes pin 252 to be withdrawn from pin recess 250, as seen in FIG. 5C. Likewise, as the distal end of crank arm handle 272 is moved toward collar 202, cam surface 276 disengages from pin head 268, thereby allowing pin 252 to be received within pin aperture 254 and/or pin recess 250. Crank arm assembly 270 can thus be configured to enable a user to grip crank arm handle 272 and thereby selectively move pin 252. Movement of pin 252 in this manner may, for example, partially or fully remove pin 252 from pin recess 250 of collar 202 and/or pin aperture 254 of sleeve 204. Similarly, movement of pin 252 in an opposite direction may insert pin 252 into pin aperture 254 and/or pin recess 250.

In some embodiments, crank arm assembly 270 is coupled to the proximate end of pin 252, thus eliminating the need for pin head 268 and cam surface 276. Alternatively, crank arm assembly 270 can be coupled to pin head 268, while pin head 268 is in turn is coupled to the proximate end of pin 252. As a result, crank arm assembly 270 can be directly or indirectly coupled to pin 252. In any configuration, crank arm assembly 270 can be either directly or indirectly coupled to or associated with pin 252 such that inward or outward movement of crank arm handle 272 correspondingly moves pin 252 inward or outward relative to collar 202.

Crank arm handle 272 can be biased such that the distal end of crank arm handle 272 tends toward a position adjacent to collar 202. In particular, crank arm handle 272 can be biased to the position illustrated in FIGS. 4A and 5B where both the proximal and distal ends of crank arm handle 272 are adjacent collar 202. Biasing crank arm handle 272 toward collar 202 provides various benefits. For example, once a user releases the distal end of crank arm handle 272, the distal end of crank arm handle 272 returns to the position adjacent collar 202, thereby reducing the overall profile of the coupling assembly. Additionally, when the distal end of crank arm handle 272 biases toward collar 202, pin 252 is allowed to move into pin aperture 254 and/or pin recess 250 if collar 202 is coupled to sleeve 204. Thus, when coupling collar 202 to sleeve 204, a user can rotate the distal end of crank arm handle 272 away from collar 202 and position collar 202 on sleeve 204 as described herein. With crank arm handle 272 being able to bias toward collar 202, however, a user does not have to manually insert pin 252 into pin recess 250. In particular, once collar 202 is positioned on sleeve 204 so that pin 252 is properly aligned with pin recess 250, a user can simply release crank arm handle 272 and allow the biasing mechanism of crank arm assembly 270 to insert pin 252 into pin recess 250. It will be appreciated that crank arm handle 272 can be biased by any suitable means. For example, crank arm handle can be bias with a resilient member, such as a spring. Also, crank arm handle 272 may be positioned on collar 202 such that gravity influences the positioning of crank arm handle 272 when the collar 202 is positioned on sleeve 204.

As noted herein, movement of the distal end of crank arm handle 272 away from collar 202 can withdraw pin 252 from pin recess 250, thereby enabling axial rotation of collar 202 relative to sleeve 204. In some circumstances, however, axial rotation of collar 202 relative to sleeve 204 may be hindered. For example, extreme temperatures and different thermal expansion rates for collar 202 and sleeve 204 may cause collar 202 and sleeve 204 to become frictionally locked together. Crank arm handle 272 can be employed to overcome the friction created by the extreme temperatures or different thermal expansion rates, or any other hinderment to the axial rotation of collar 202 relative to sleeve 204. More specifically, once pin 252 is withdrawn from pin recess 250 and crank arm handle 272 is in the position illustrated in FIGS. 5A and 5C, crank arm handle 272 can be used to increase the torque applied to collar 202 to cause axial rotation of collar 202 relative to sleeve 204. Thus, crank arm handle 272, as illustrated in FIGS. 5A and 5C, can be employed to rotate collar 202 in a counterclockwise direction with greater torque and/or less force than would be required in using only collar handle 260.

Furthermore, crank arm assembly 270 can be rotatably mounted on collar 202 so that crank arm handle 272 can be rotated about an axis that is perpendicular to the central axis of collar 202. For example, in the illustrated embodiment, crank arm assembly 270 is rotatably mounted on collar 202 so that is rotates about the longitudinal axis of pin 252. Thus, crank arm handle 272 can be rotated from the position illustrated in FIG. 5A to the position illustrated in FIG. 5D, and further rotated to the position illustrated in FIG. 5E. Rotation of crank arm assembly 270 is this manner allows crank arm handle 272 to be employed to both couple collar 202 to sleeve 204 and decouple collar 202 from sleeve 204. In particular, as described above, when crank arm handle is in the position illustrated in FIG. 5A, crank arm handle 272 can be used to rotate collar 202 is a counterclockwise direction to disengage collar 202 from sleeve 204. Alternatively, crank arm handle 272 can be rotated to the positioned illustrated in FIG. 5E and used to rotated collar 202 in a clockwise direction to couple collar 202 to sleeve 204. While the present embodiment has been described with clockwise rotation of collar 202 to couple collar 202 to sleeve 204 and counterclockwise rotation of collar 202 to decoupled collar 202 from sleeve 204, it will be appreciated that in some embodiments collar 202 can be rotated clockwise to decouple collar 202 from sleeve 204 and rotated counterclockwise to couple collar 202 to sleeve 204.

As illustrated in FIGS. 2 and 4A, crank arm handle 272 may extend around a portion of the circumference of collar 202. In the illustrated embodiment, for example, crank arm handle 272 defines an arc of about ninety (90) degrees about the circumference of collar 202. However, the arc defined by crank arm handle 272 can be larger or smaller than ninety (90) degrees. For example, in other embodiments, crank arm handle 272 defines an arc of about forty-five (45) degrees, about sixty (60) degrees, or about one hundred twenty (120) degrees.

In the example embodiment of FIGS. 4A-5E, collar handle 260 and crank arm handle 272 are positioned adjacent to each other. Thus, collar handle 260 and crank arm handle 272 my be positioned such that a user can simultaneously grip both collar handle 260 and crank arm handle 272 with either one or two hands. In other embodiments, however, a recess of about the shape of crank arm handle 272 is formed in collar handle 260, and crank arm handle 272 is positioned such that it generally corresponds with the recess in collar handle 260. Accordingly, collar handle 260 and crank arm handle 272 can have a stacked or nested arrangement.

In the illustrated embodiment, a radius from a central, longitudinal axis of collar 202 to collar handle 260 can be definite and unchanging. The distance from the longitudinal axis of collar 202 to the distal end of crank arm handle 272 may, however, vary. For example, as the distal end of crank arm handle 272 is moved away from collar 202, the distance between the longitudinal axis of collar 202 and the distal end of crank arm handle 272 increases. In some embodiments, crank arm handle 272, in an innermost position, has a radius slightly smaller than the fixed radius of collar handle 260, although in other embodiments crank arm handle 272 has a radius about equal to, or larger, than collar handle 260. As described herein, the innermost position of crank arm handle 272 can correspond to a biased position of pin 252.

As discussed above, pin 252 can move with respect to pin aperture 254 and/or pin recess 250 and may be withdrawn at least partially therefrom. When pin 252 is connected to crank arm handle 272, this may occur by, for example, exerting a force which pulls the distal end of crank arm handle 272 away from collar 202. Because pin 252 can be withdrawn from pin aperture 254 and/or pin recess 250 by pulling the distal end of crank arm handle 272 away from collar 202, the distance between the distal end of crank arm handle 272 and the central axis of collar 202 and/or sleeve 204 can increase. Accordingly, in one embodiment, the distance between the central, longitudinal axis of collar 202 and distal end of crank arm handle 272 can increase to a distance about equal to, or greater than, the radius of collar handle 260. In one embodiment, when the distal end of crank arm handle 272 is about diametrically aligned with collar handle 260, pin 252 is withdrawn from pin recess 250. In some embodiments, crank arm handle 272 can be used to entirely withdraw pin 252 from both pin aperture 254 and pin recess 250.

Various configurations of a pin recess 250 are envisioned within the scope of the present invention. One such configuration is illustrated in FIG. 3A, in which pin recess 250 comprises terminal segment 214 of groove 208. In other words, pin recess 250 and terminal segment 214 can constitute the same recess within sleeve 204. Thus, when pin 252 is positioned in pin recess 250 and/or terminal segment 214, engagement members 258 may be aligned with, and optionally positioned in, circumferential segment 212. Of course, in other embodiments, pin recess 250 may be aligned with, and potentially include, entry segment 210 or circumferential segment 212. In still other embodiments, pin recess 250 is not aligned with any portion of groove 208.

Pin 252 can be held in position within pin aperture 254 and/or pin recess 250 by any of a number of different mechanisms. For example, pin 252 may be biased into the position illustrated in FIGS. 4A and 4B by use of a spring or resilient member (not shown). Alternatively, pin 252 may be biased through an interference fit between pin shaft 266 of pin 252 and one or both of pin aperture 254 and pin recess 250. Also, pin aperture 254 and pin recess 250 may be positioned in collar 202 and sleeve 204, respectively, such that when the fluid conduit 104 (FIG. 1) is stationary, pin aperture 254 and pin recess 250 face generally upward or in another alignment that allows gravity to influence the positioning of pin 252.

Pin 252 is optionally selectively removable from pin recess 250 and/or pin aperture 254 so as to enable axial rotation of collar 202 with respect to sleeve 204. For example, the ability of pin 252 to move with respect to pin aperture 254 and/or pin recess 250 enables pin 252 to be selectively removable. In at least one embodiment, pin 252 can be completely removed from both pin aperture 254 and pin recess 250 by a user to enable axial rotation of collar 202 with respect to sleeve 204. Alternatively, pin 252 can be removed, selectively by a user, by moving pin 252 such that the distal end of pin shaft 266 is no longer received in pin recess 250 of sleeve 204, thus enabling axial rotation of collar 202 with respect to sleeve 204. Collar 202 can thus be selectively secured to sleeve 204 by a user positioning pin 252 in pin recess 250 as is sufficient to substantially prevent axial rotation of collar 202 with respect to sleeve 204.

While the present invention has been described herein as comprising a collar 202 that allows fluid to flow therethrough, it will be appreciated that collar 202 can comprise other types of fluid coupling components without departing from the scope of the present invention. For example, collar 202 can include an end plate (not shown) that extends across one end of collar 202 in such a way as to assist in defining an end of a fluid passageway from fluid conduit 104 when collar 202 and sleeve 204 are fully engaged. In one embodiment, the end plate and collar 202 comprise a single integral piece. However, in other embodiments, the end plate and collar 202 can comprise discrete structures that are or can be joined together. Thus, collar 202 can comprise an end cap to limits the flow of fluid through the fluid system.

The operational features relating to the coupling and decoupling of collar 202 and sleeve 204 of the example embodiment of FIGS. 2-5E will now be discussed in greater detail. Prior to collar 202 receiving a portion of sleeve 204 therein, the distal end of pin shaft 266 should not extend beyond the inner surface of collar 202. Otherwise, as sleeve 204 is inserted into collar 202, pin 252 may inadvertently engage sleeve 204 and make it difficult to couple collar 202 to sleeve 204. The distal end of pin shaft 266 can be withdrawn from the inner surface of collar 202, as described above, by simply exerting a force on the distal end of crank arm handle 272 so as to extend the distal end of crank arm handle 272 in a radial direction away from the center of collar 202, as seen in FIGS. 5A and 5C. Radial movement of crank arm handle 272 can cause corresponding movement of at least the distal end of pin shaft 266, thereby withdrawing pin shaft 266 from within the inner surface of collar 202, as seen in FIG. 5C.

With pin 252 withdrawn from the inner surface of collar 202, engagement of collar 202 and sleeve 204 can be effected by positioning each engagement member 258 in a corresponding groove 208 and causing engagement members 258 to travel along grooves 208 according to the path denoted in FIG. 3A, for example. More particularly, collar 202 and sleeve 204 may be brought together until each engagement member 258 of collar 256 is positioned at the beginning of an entry segment 210 (see FIG. 3A) of a corresponding groove 208 of sleeve 204. Rotation of collar 202 is then initiated by way of collar handle 260 and/or crank arm handle 272. As a result of the angular orientation of entry segments 210 with respect to the front edge of sleeve 204, the initial rotation of collar 202 causes collar 202 to be drawn toward sleeve 204. In other words, as engagement members 258 are advanced in entry segment 210 of groove 208, collar 202 rotates relative to sleeve 204.

Continued rotation of collar 202 can cause engagement members 258 to complete their traverse of corresponding entry segments 210, and move into their respective circumferential segments 212. Engagement members 258 can remain in circumferential segments 212 until such time as a predetermined pressure level is attained in the fluid passageway conduit 104 collectively defined by collar 202, sleeve 204, and fluid conduit 104, or when rotated into that position by a user.

In the illustrated embodiment, collar 202 and sleeve 204 comprise guide pins 280 and 282, respectively. Guide pins 280, 282 provide a visual confirmation to a user that collar 202 has been fully rotated onto sleeve 204. Specifically, once collar 202 has been rotated onto sleeve 204 so that engagement members 258 are properly securely positioned within grooves 208, guide pin 280 will align with guide pin 282, thereby providing a visual confirmation to the user that collar 202 is securely coupled to sleeve 204. Guide pins 280, 282 can comprise any suitable structure or indicator that is capable of providing a visual indication to a user that collar 202 and sleeve 204 are aligned and securely coupled together. By way of example and not limitation, guide pins 280, 282 can be bolts, notches, cutouts, or markings on/in the sides of collar 202 and sleeve 204 that are positioned to align with one another when collar is properly positioned on sleeve 204.

In one embodiment, the collar 202 is rotated and positioned such that engagement members 258 are in respective circumferential segments 212. Once collar 202 is in such a position, fluid can be introduced into fluid conduit 104, and the distal end of pin shaft 266 can be positioned in pin recess 250 of sleeve 204 so as to substantially prevent axial rotation of collar 202 with respect to sleeve 204. It will be appreciated in view of the disclosure herein that pin recess 250 of sleeve 204 may extend at least partially along the length of the sleeve such that as pressure is introduced in the fluid conduit 104, engagement members 258, attached to collar 202, may be able to move and lock up into corresponding terminal segments 214 of grooves 208 and remain therein, as indicated in FIG. 3A. In other embodiments, as fluid is introduced into fluid conduit 104, pin shaft 266 may be positioned in terminal segment 214 so as to prevent movement of engagement members 258 along circumferential segments 212.

In still other embodiments, after the introduction of fluid, and while the line is pressurized, pin shaft 266 may be removed from terminal segment 214 or another recess, thereby allowing engagement members 258 to again move in circumferential segment 212. Alternatively, pin 252 may be excluded. In either case, the pressure thus exerted by the fluid in fluid conduit 104, denoted at P in FIG. 3A, may allow collar 202 to at least partially rotate relative to sleeve 204. The pressure can, however, transmit a force to collar 202. Consequently, as engagement members 258 approach terminal segments 214, the exertion of pressure P in this way forces engagement members 258, optionally attached to collar 202, to move into and lock up into corresponding terminal segments 214 of grooves 208 and remain therein, as indicated in FIG. 3A.

In the illustrated embodiment, the forward motion of collar 202 may, depending on the position of engagement members 258 at the time of pressurization of fluid conduit 104, be accompanied by a rotary motion of collar 202 as well. The rotary motion of collar 202 can cause engagement members 258 to travel along circumferential segments 212 and come to rest in terminal segments 214 of grooves 208.

Once engagement members 228 are seated in their corresponding terminal segments 214 of grooves 208, the continuing presence of pressure P exerts a force on collar 202 that resists motion of engagement members 258 in the opposite direction, i.e., out of their corresponding terminal segments 214, and thereby aids in the retention of engagement members 258 in terminal segments 214. As a result, collar 202 and sleeve 204 cannot be disengaged from each other by the user until the fluid pressure in fluid conduit 104 has been reduced to a predetermined level.

Thus, engagement members 258 and grooves 208 cooperate with each other, one feature of which is the employment of the line pressure to ensure a secure connection between collar 202 and sleeve 204 subsequent to pressurization of fluid conduit 104, and even in the event pin 252 is removed from pin recess 250 during pressurization. Thus, the likelihood of inadvertent, or intentional, removal of collar 202 while a potentially dangerous level of pressure exists in fluid conduit 104 is materially reduced.

As will thus be appreciated by one of ordinary skill in the art in view of the disclosure herein, if pin 252 is withdrawn from pin recess 250 before the pressure within fluid conduit 104 is released, the pressure in fluid conduit 104 will press against collar 202. Such pressure can cause engagement members 258 to move along grooves 208 toward entry segments 210. Without terminal segments 214, engagement members 258 could exit groove 208, thereby resulting in disengagement of collar 202 and sleeve 204. Disengagement of collar 202 and sleeve 204 while fluid conduit 104 is still under pressure can result in numerous dangers. For instance, fluid can leak into the environment and/or the fluid pressure may forcibly cause collar 202 to become dislodged from fluid conduit 104. Collar 202 may then uncontrollably fly off fluid conduit 104 and hit an operator, user, or equipment, or the fluid itself my forcibly exit and contact a user or equipment, thereby causing serious bodily injury or property damage.

Notably, when terminal segment 214 is employed, such problems can be entirely or largely prevented. Specifically, if pin 252 is withdrawn from pin recess 250 while the fluid passageway is under pressure, engagement members 258 will begin to move along grooves 208 towards entry segments 210; however, before reaching entry segments 210, engagement members 258 will encounter and engage terminal segments 214 as described above. The groove geometry of terminal segments 214 is configured to use the line pressure in such a way to prevent further movement of engagement members 258 toward entry segments 210, and thus also prevent disengagement of collar 202 and sleeve 204. Once the pressure in fluid conduit 104 is released, or reduced beyond a determined level, the line pressure can be overcome and a user will be able to disengage engagement members 258 from terminal segments 214. Once engagement members 258 are disengaged from terminal segments 214, collar 202 and sleeve 204 can be safely disengaged.

While the foregoing are example embodiments in which the line pressure is released before engagement members 258 can be removed from terminal segments 214, it will be appreciated in view of the disclosure herein that such are exemplary only. For example, in other embodiments, the line pressure need not be entirely reduced. Instead, in one example, engagement members 258 may become fixed within terminal segments 214, as described above, when the line pressure is above a predetermined level. Once the line pressure is reduced below that predetermined level, which can be zero or greater than zero pressure, the user may be able to overcome the line pressure and disengage engagement members 258 from terminal segments 214. The predetermined level may be a pressure that does not cause significant leakage of the fluid from conduit 104 and/or a level that is determined to pose minimal or no risk of significant bodily injury.

The present invention may be embodied in other specific forms without a departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A coupling for use in a fluid system, comprising:
   a collar having at least one engagement member to facilitate engagement of said collar and a sleeve; and
   a crank arm assembly configured to facilitate selective engagement and disengagement of said collar and said sleeve, said crank arm assembly comprising:
      a pin movably mounted relative to said collar, said pin being adapted to engage said sleeve to prevent axial rotation between said collar and said sleeve; and
      a crank arm handle that is pivotally coupled at one end thereof to said collar such that said crank arm handle is pivotable from a first position to a second, extended position, said crank arm handle having a cam surface that engages said pin when said crank arm handle is pivoted from said first position to said second, extended position to selectively disengage said pin from said sleeve.

2. The coupling as recited in claim 1, said pin being adapted to be selectively inserted at least partially into said sleeve when said crank arm handle is pivoted to the first position.

3. The coupling as recited in claim 2, wherein said pin is adapted to be selectively removed from said sleeve when said crank arm handle is pivoted to the second, extended position.

4. The coupling as recited in claim 2, wherein said crank arm handle is adapted to be used as a lever when in said second, extended position to facilitate coupling or decoupling of said collar and said sleeve.

5. The coupling as recited in claim 1, wherein said crank arm handle extends at least partially around said collar.

6. The coupling as recited in claim 1, wherein said crank arm assembly is rotatably coupled to said collar so as to enable said crank arm handle to be rotated relative to said collar about an axis that is transverse to a central axis of said collar.

7. The coupling as recited in claim 1, wherein said collar defines a pin aperture for receiving said pin at least partially therein.

8. The coupling as recited in claim 7, wherein said sleeve defines a pin recess for receiving said pin.

9. The coupling as recited in claim 7, wherein said sleeve further defines at least one groove about the outer surface of said sleeve, said pin recess comprising at least one notch that is substantially in the shape of a "J," and wherein said pin engages an end of a "hook" portion of said "J" shaped notch to prevent axial rotation of said collar relative to said sleeve.

10. The coupling as recited in claim 9, wherein the coupling is configured such that said pin can engage a location proximate the end of said "hook" portion of said "J" shaped notch if said pin becomes disengaged from said sleeve.

11. A coupling for use in a fluid system, comprising:
- a fluid conduit comprising a sleeve defining at least one groove, said groove extending at least partially about a circumference of said sleeve and having a substantially "J" shaped notch;
- a collar configured to receive at least a portion of said sleeve therein, said collar including at least one engagement member configured to be received in said at least one groove to facilitate engagement between said collar and said sleeve;
- a coupling member movably mounted to said collar and configured to engage said sleeve to substantially prevent axial rotation of said collar relative to said sleeve, said coupling member having a longitudinal axis; and
- a crank arm assembly having a crank arm handle pivotally and rotatably coupled at a first end thereof to said collar, said crank arm handle being adapted to: i) pivot from a first position to a second, extended position to disengage said coupling member from said sleeve to facilitate axial rotation of said collar relative to said sleeve when said collar is being disengaged from said sleeve, and ii) rotate about an axis that is substantially parallel to said longitudinal axis of said coupling member.

12. The coupling as recited in claim 11, wherein said coupling member comprises a pin.

13. The coupling as recited in claim 11, wherein said movement of said crank arm handle from said first position to said second, extended position corresponds to movement and disengagement of said coupling member from said sleeve.

14. The coupling as recited in claim 11, wherein a second end of said crank arm handle extends at least partially around said collar in a first direction.

15. The coupling as recited in claim 14, wherein said crank arm assembly is rotatably coupled to said collar so as to enable said crank arm handle to be rotated about said longitudinal axis of said coupling member so that said second end of said crank arm handle extends at least partially around said collar in a second direction.

16. The coupling as recited in claim 11, wherein said crank arm handle is adapted to be used as a lever when in said second, extended position to facilitate coupling or decoupling of said collar and said sleeve.

17. A coupling for use in a fluid system, comprising:
- a sleeve defining at least one groove, said at least one groove extending at least partially about a circumference of said sleeve;
- a collar configured to receive at least a portion of said sleeve within an interior of said collar and including at least one engagement member configured to be received in said at least one groove to facilitate engagement between said collar and said sleeve, said collar having a collar handle disposed at least partially around its outer surface; and
- a crank arm assembly, comprising:
  - a pin movably mounted to said collar, said pin being adapted for selective insertion into said interior of said collar for engagement with said sleeve to prevent axial rotation of said collar relative to said sleeve; and
  - a crank arm handle coupled at a first end thereof to said collar, a second end of said crank arm handle being adapted to pivot from a first position adjacent said collar to a second position distant from said collar, said first end of said crank arm handle having a cam surface adapted to engage said pin when said second end of said crank arm handle is pivoted from said first position to said second position to disengage said pin from said sleeve.

18. The coupling as recited in claim 17, wherein said crank arm handle extends at least partially around said collar in a first direction, wherein said crank arm handle facilitates axial rotation of said collar relative to said sleeve in a second direction when said crank arm handle extends in said first direction and is in said second position distant from said collar.

19. The coupling as recited in claim 18, wherein said crank arm assembly is rotatably mounted to said collar to enable said crank arm handle to be rotated about an axis transverse to a central axis of said collar so that said crank arm handle can extend at least partially around said collar in said second direction, wherein said crank arm handle facilitates axial rotation of said collar relative to said sleeve in said first direction when said crank arm handle extends in said second direction and is in said second position distant from said collar.

20. The coupling as recited in claim 17, wherein said groove includes a substantially "J" shaped notch, said "J" shaped notch being adapted to receive said pin therein to prevent axial rotation of said collar relative to said sleeve.

* * * * *

UNITED STATES PATENT AND TRADEMARK OFFICE
CERTIFICATE OF CORRECTION

| | | |
|---|---|---|
| PATENT NO. | : 7,988,200 B2 | |
| APPLICATION NO. | : 12/176718 | |
| DATED | : August 2, 2011 | |
| INVENTOR(S) | : Lee A. Krywitsky | |

It is certified that error appears in the above-identified patent and that said Letters Patent is hereby corrected as shown below:

Title Page, Item 57, ABSTRACT, Right Hand Column
Line 14, change "withdrawn" to --withdraw--

Column 5
Line 34, after "FIG. 3C" insert --is a--

Column 8
Line 40, change "such exemplary" to --such an exemplary--

Column 11
Line 12, change "is in turn is" to --in turn is--
Line 42, change "bias" to --biased--

Column 12
Line 4, change "that is rotates" to --that it rotates--
Line 13, change "is" to --in--
Line 15, change "positioned" to --position--
Line 16, change "rotated" to --rotate--
Line 20, change "decoupled" to --decouple--

Column 13
Line 58, change "limits" to --limit--

Column 14
Line 17, change "collar 256" to --collar 202--

Column 15
Line 20, change "engagement members 228" to --engagement members 258--
Line 53, change "my" to --may--

Signed and Sealed this
Thirteenth Day of March, 2012

David J. Kappos
*Director of the United States Patent and Trademark Office*

Column 16
Line 21, change "without a departing" to --without departing--